UNITED STATES PATENT OFFICE.

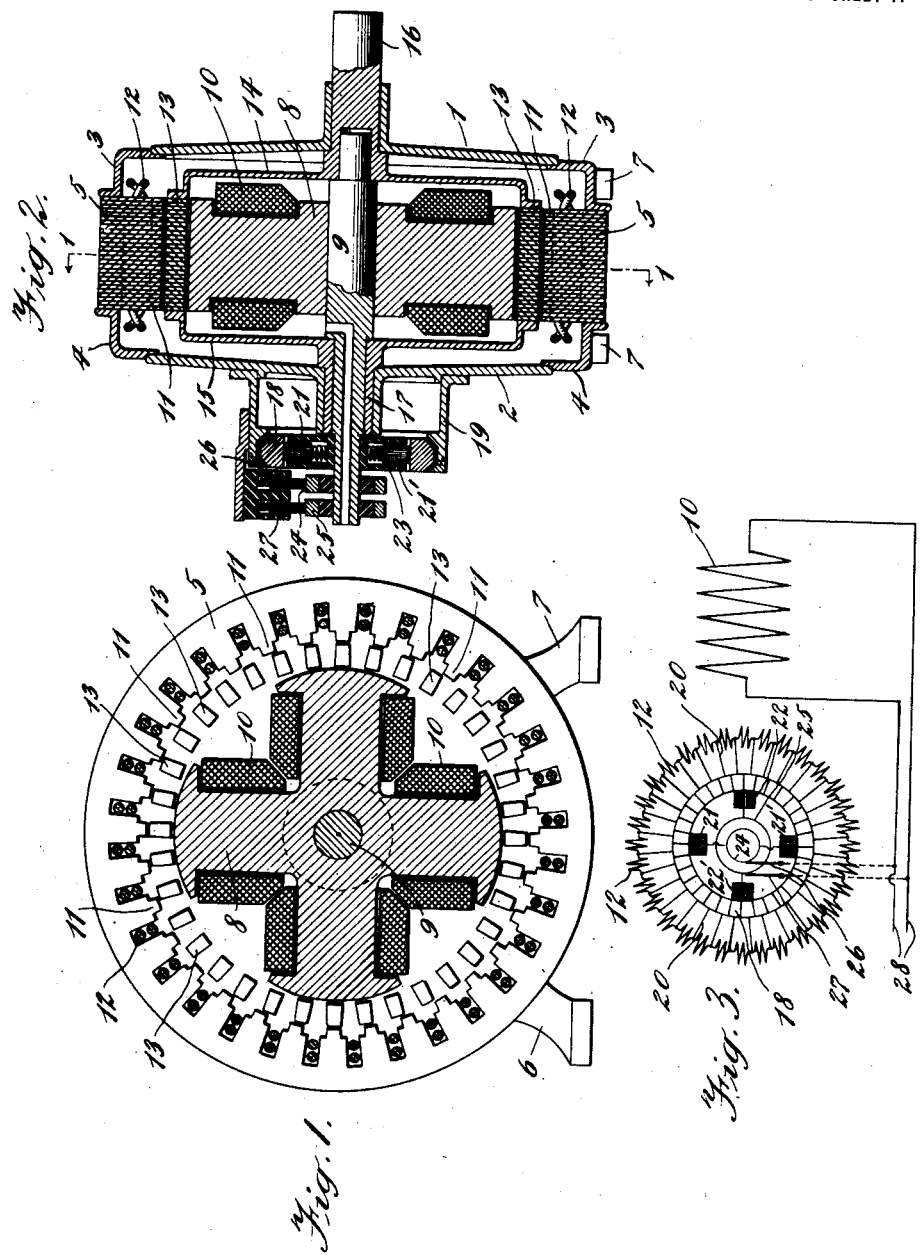

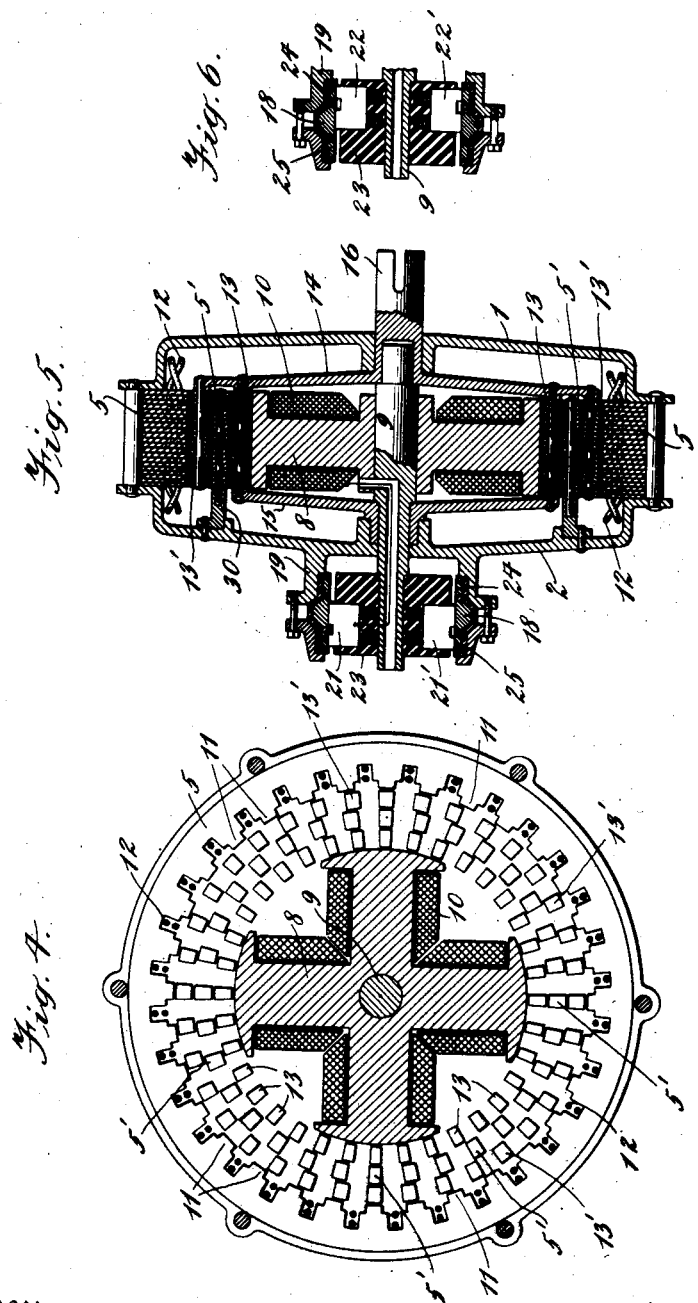

ALFONS H. NEULAND, OF BERGENFIELD, NEW JERSEY.

DYNAMO-ELECTRIC MACHINE.

1,171,134.      Specification of Letters Patent.      Patented Feb. 8, 1916.

Application filed March 4, 1914. Serial No. 822,254.

*To all whom it may concern:*

Be it known that I, ALFONS H. NEULAND, a subject of the Czar of Russia, residing at Bergenfield, in the county of Bergen and State of New Jersey, have invented certain new and useful Improvements in Dynamo-Electric Machines, of which the following is a full, clear, and exact description.

My invention relates to dynamo-electric machines and particularly to such machines of the commutator type.

In my two co-pending applications, Serial No. 756,162, filed March 22, 1913, and Serial No. 762,525, filed April 21, 1913, I have disclosed dynamo-electric machines comprising two rotatable members and a fixed or stationary member which are coupled by a magnetic flux and in which electrical energy is converted into mechanical energy and rotation obtained by varying the distribution of the magnetic flux. As illustrated in said applications, these devices consist of three concentric members, the field member being stationary, and the other two members being rotative. One of the rotative members acts as the inductor or flux-valve and operates to vary the distribution of the flux to thus cause the other rotative member to rotate. In the said application, Serial No. 756,162, this is embodied in what I term as a speed-changing device in which only magnetizing coils are employed upon the stationary field member. One of the rotative members is employed as the driving member and the other as the driven member, and rotation is imparted from one shaft to another, for example, the speed depending upon the relative pitch of teeth of coöperative magnetic projections on the members. In my said application Serial No. 762,525, this is embodied in a dynamo-electric machine of the commutating type, the stationary or field member also being provided with induction windings and the commutator being carried by the high speed rotative member. In both of these devices, however, there is a loss of efficiency due to the reaction between the stationary field member and the rotative members, and an object of my invention is to obviate this disadvantage and to provide a machine of this sort which may be used either as a speed-changing device or as a motor-dynamo, and which will be of high efficiency and of light weight.

Another object of my invention is the production of a powerful torque at slow or medium speeds, and embodiments of my invention are particularly adapted for use as a starter for internal combustion engines.

Other objects of my invention are simplicity of commutator construction, facility in commutation, durability and inexpensiveness of construction, and reliability in operation.

Still other objects and advantages of my invention will appear from the following description.

In accordance with my invention, I provide means for producing a revolving magnetic field, and specifically this is obtained by making the field member rotative, and coöperative therewith are two armatures or members composed of magnetic material, one of which is stationary and the other rotative. Specifically, the two armature members are provided with coöperative series of magnetic conductors which tend to successively assume radial alinement as the field revolves, whereby rotation is imparted to the movable member. It will, of course, be understood that the field member and rotative armature may be used interchangeably as the driving and driven member, respectively, and hereafter in the specification and claims wherever the rotation of the field member is referred to as imparting rotation to the rotative armature, it will be understood that this language is intended to comprehend the reverse operation.

In its preferred embodiment the device has armature coils upon the stationary armature, and a commutator carried by the stationary armature, and brushes carried by the field member to which the field coils are connected and which engage the commutator surface. Preferably the commutator has its internal cylindrical surface employed as a commutator surface, and the brushes engage this internal surface, which is divided into a number of insulated segments connected to the armature coils. Preferably, also, since the brushes are rotative, they connect with collector rings, from which current may be taken off or to which current may be supplied.

My invention also comprehends various other features of construction and arrangements and combinations of parts as will hereinafter more fully appear.

I shall now describe the embodiments of my invention illustrated in the accompanying drawings, and shall thereafter point out my invention in claims.

Figure 1 is a transverse section of a complete machine embodying my invention, taken on the line 1—1 of Fig. 2; Fig. 2 is a central longitudinal section of the same; Fig. 3 is a diagram of the commutator and electrical circuits; Fig. 4 is a view similar to Fig. 1, showing a modified embodiment of my invention; Fig. 5 is a view similar to Fig. 2 of the same embodiment, and Fig. 6 is a detail in central section of the commutator mechanism, taken at right angles to the plane of section of Fig. 5.

The illustrated embodiments of my invention are particularly designed and adapted for use as high power, slow speed motors, and will be so described. The machine illustrated in Figs. 1 and 2, has a generally cylindrical casing composed of side plates 1 and 2 and two flanged circumferential plates 3 and 4 between which is secured a stationary annular laminated armature 5. The circumferential plates 3 and 4 may each be provided with a pair of supporting legs 6 and 7, respectively. Coöperative with the stationary armature 5 is a rotative field member 8 which is mounted upon the central longitudinal axis 9, and is shown as multipolar and having two pairs of poles. although it will be understood that the number of pairs of poles is arbitrary. A field winding 10 is provided upon the rotative field member, suitably wound to produce two opposite north poles and two opposite south poles, the poles of opposite polarity being 90° apart. The rotative field member 8 is generally in the form of a cross, and the ends of the pole-pieces lie in a circle concentric with the shaft 9 and with the armature 5. The poles are of such length as to leave a substantial air gap between their ends and the inner periphery of the armature 5, and in this annular air space is arranged the third member comprising a rotative member or armature. Since in the use of the machine as a motor, power is taken off from this intermediate member, I also term it the power member or power element.

The inner periphery of the stationary armature 5 is provided with a plurality of equally-spaced longitudinally-extending teeth 11, shown as thirty-two in number, and in the slots between the teeth is embedded a suitable armature winding 12, interconnected to form a four-pole arrangement.

The rotatable armature or power element comprises a plurality of equally-spaced longitudinally-extending laminated bars 13, circularly disposed in the annular space between the ends of the pole-pieces and the stationary armature 5, and of such thickness as to leave a minimum of clearance or air gaps between the bars 13 and the ends of the pole-pieces and the inner ends of the teeth 11. The bars 13 are of substantially the same width as the teeth 11, and differ in number therefrom by the number of poles on the field member, in the embodiment shown being four more than the number of teeth, or thirty-six in number. As the rotatable armature rotates, therefore, the bars 13 will successively radially aline with the teeth 11, and there are four points of alinement.

The bars 13 are secured between the inwardly flanged peripheries of side plates 14 and 15 for the power element, which are secured to or integral with hubs 16 and 17, respectively, which bear in hubs on the side plates 1 and 2. The hub 16 may be extended, as shown, and serve as the power or armature shaft in the usual way. The ends of the axis 9 which are shown as reduced in diameter, bear in the hubs of the rotatable armature, the inner end of the hub 16 being provided with a shallow bore for that purpose, and the hub 17 being hollow and the end of the axis 9 extending through the hollow hub and carrying the commutator brushes on its outer end, as will hereinafter appear.

It is now apparent that, since the three members are coupled by the magnetic flux, the two rotative parts, that is, the rotative field member and the rotative armature, will tend to assume a position which will provide a path of least magnetic reluctance, in which position the axes of the poles are respectively alined with the four points of alinement of the teeth 11 and bars 13, as shown in the drawings, and movement of one rotative part will therefore cause a movement of the other rotary part to maintain this relationship.

It is evident that with the illustrated construction, the rotation of the rotatable armature for a distance equal to the pitch of the bars 13 will cause the gradual circumferential progression of the magnetic paths of one quarter of a revolution, and such a rotation of the rotatable armature will be effected by the rotation of the field member one quarter of a complete rotation, the rotation of the two parts being in the same direction since the number of bars 13 exceeds that of the teeth 11. In other words, the relative angular velocity between the field member and the rotatable armature is as 9 to 1, the magnetic paths making nine complete revolutions to each rotation of the rotatable armature.

The stationary armature 5 carries the commutator 18, which is shown externally clamped and supported in the outer end of an annular supporting member 19 attached to the side plate 2, the commutator concentrically surrounding the outer end of the axis 9 with its inner periphery exposed. The commutator is divided in a plurality of insulated segments, shown as thirty-two in number, corresponding in number to the coils which are connected to the respective commutator segments by taps 20. Two brushes of each polarity, 21 and 21', and 22 and 22', are carried in a brush-holder 23 on the axis 9 and are pressed outwardly by springs, as shown, into engagement with the inner face of the commutator. The position of the rotating brushes is such that they will produce in the armature windings 12 a current in electrical space-quadrature with the pole-pieces. The four brushes are also electrically connected to slip rings 24 and 25 on the end of the axis 9, the two brushes of each polarity being connected to a common slip-ring, and the field windings 10 are connected to the respective rings, while brushes 26 and 27 which engage the rings are connected to the external circuit 28. The commutator end of the axis 9 is provided with a longitudinal bore 29, which communicates with a lateral bore inside the side plate 15 of the rotative armature, and through which connection is made between the brushes and rings and field winding 10.

A current flowing in the exciting and armature windings will create a torque between the stationary armature 5 and the field member 8, which will cause the field member to rotate, and with it the brushes carried thereby, which will preserve the space-quadrature relation between the pole-pieces and the current in the armature winding, and, as explained above, rotation will thereby be imparted to the rotatable armature or power element with a powerful torque and at one-ninth the angular velocity of the field member.

It will be manifest that this machine is well adapted for use as a starter for internal combustion engines, the hub 16 of the power element being directly connected to the engine shaft. There are no gears required and the field member rotates only when the current is turned on, and comes to a stop as soon as the engine is started and the current turned off, thereby insuring long life to the commutator and brushes. On account of its powerful torque, the device may be of small size and light weight, occupying but a small space and being convenient to install and adding but little to the weight of the engine.

It will furthermore be seen that, in addition to its use as a high power, slow speed, light weight motor, this device may also be used as a generator of direct currents, and also as a means for increasing or decreasing the speed of rotative parts or members, such as engines, motors, etc., depending on whether the rotative armature and shaft 16 be used as the driving or driven member, in which use the commutator and the armature winding may be dispensed with.

In Figs. 4, 5 and 6, I have shown a somewhat different embodiment of my invention. It will be noted that the teeth 11 and the bars 13 are progressively more and more alined between the points of alinement and the intermediate points, at which latter points they are in complete staggered relation to each other. In order to more thoroughly break the magnetic path between the field member 8 and the stationary armature 5 at these intermediate points and thereby increase the strength of the magnetic coupling between the rotating field and armature, the air gap between the inner ends of the teeth 11 and the outer ends of the pole-pieces is increased to accommodate a plurality of series of laminated magnetic bars. In this latter illustrated embodiment, there are three series shown, but it will be apparent that this number may be increased as desired, the series of stationary bars carried by the stationary armature being arranged in alternate relation to the series of rotatable bars carried by the rotatable armature. In the construction shown, in addition to the series of magentic bars 13, the rotatable armature is provided with another series of bars 13' outside of and concentric with the inner series of bars 13 and arranged in radial alinement therewith, the outer series of bars 13 being supported upon an extension of the side plate 14 of the rotatable armature, as shown. The stationary series of bars 5' is disposed between the two series of bars 13 and 13' and is supported upon an annular supporting member 30 carried by the side plate 2 of the machine. The bars 5' are arranged in inward radial alinement with the teeth 11 on the stationary armature 5. It will be seen, therefore, that these magnetic bars are alined at the same points that the teeth and bars are alined in the construction shown in Fig. 1, while at their points of non-alinement they effectively break the magnetic path. In this embodiment the commutating mechanism is also shown of slightly different construction. The slip-rings 24 and 25 are arranged on opposite sides of the commutator 18, the three members being coaxial and insulated from each other. The brushes are of sufficient width to engage the commutator and one ring, as shown, the brushes 21 and 21' engaging the commutator and the ring 25, as shown in Fig. 5, and the brushes 22 and 22' engaging the commutator and the ring 24, as shown in Fig. 6. This provides for a more compact and somewhat simpler arrangement of the commutator and rings. It will be noted that the commutator is of small size and of convenient construction and that a much smaller number of segments is required than would be the case if the commutating element rotated at the relatively slow angular velocity of the power element.

It is obvious that various modifications may be made in the construction shown in the drawings and above particularly described within the principle and scope of my invention.

I claim:—

1. A dynamo-electric machine comprising a rotatable magnet, a stationary member having a plurality of spaced magnetic conductors circularly disposed around the magnet and extending parallel to the axis thereof, and a rotatable member having a plurality of spaced magnetic conductors arranged concentric with and adjacent to those of the stationary member and adapted to successively radially aline with those of the stationary member as the rotatable member rotates, whereby rotation of one rotatable part will cause the rotation of the other rotatable part.

2. A dynamo-electric machine comprising a rotative magnet, a stationary member having a plurality of spaced magnetic conductors circularly disposed around the magnet and extending parallel to the axis thereof, and a driven member having a plurality of spaced magnetic conductors arranged concentric with and adjacent to those of the stationary member and adapted to successively radially aline with those of the stationary member and provide closed paths for the magnetic flux as the magnet rotates and thereby impart rotation to the driven member.

3. A dynamo-electric machine comprising a rotative magnet, a stationary member having a plurality of spaced magnetic conductors circularly disposed around the magnet and extending parallel to the axis thereof, and a driven member having a plurality of spaced magnetic conductors arranged between the magnet and stationary member and concentric with and adjacent to the magnetic conductors of the stationary member and adapted to successively radially aline with those of the stationary member and provide closed paths for the magnetic flux as the magnet rotates and thereby impart rotation to the driven member.

4. A dynamo-electric machine comprising a rotative field member and a winding therefor, a stator axially surrounding the field member and having a plurality of longitudinally-extending spaced magnetic conductors, and a driven member having a plurality of spaced longitudinally-extending magnetic conductors adapted to successively radially aline with those of the stator and provide closed paths for the magnetic flux as the field member rotates and thereby impart rotation to the driven member.

5. A dynamo-electric machine comprising a rotative field member and a winding therefor, a stator axially surrounding the field member and having a plurality of longitudinally-extending spaced magnetic conductors, and a driven member having a different number of spaced longitudinally-extending magnetic conductors disposed between the stator and field member and adapted to successively radially aline with those of the stator and provide closed paths for the magnetic flux as the field member rotates and thereby impart rotation to the driven member.

6. A dynamo-electric machine comprising a rotative field member and a winding therefor, a stator axially surrounding the field member and having a plurality of longitudinally-extending spaced magnetic conductors, and a driven member having a plurality of spaced longitudinally-extending magnetic conductors differing in number from those of the stator by the number of poles on the field member and adapted to successively radially aline with those of the stator and provide closed paths for the magnetic flux as the field member rotates and thereby impart rotation to the driven member.

7. A dynamo-electric machine comprising a rotative field member and a winding therefor, two concentric armatures surrounding the field member one being stationary and the other rotative and both having a plurality of spaced longitudinally-extending magnetic conductors, and a winding on one armature arranged in the spaces between the magnetic conductors, the magnetic conductors on the rotative armature being adapted to successively radially aline with those on the stationary armature and form closed paths for the magnetic flux as the field member rotates.

8. A dynamo-electric machine comprising a rotative field member and a winding therefor, a cylindrical armature axially surrounding the field member and provided with a plurality of internal spaced longitudinally-extending teeth and having an armature winding arranged in the slots between the teeth and a coöperative armature having a plurality of circularly-arranged spaced longitudinally-extending magnetic conductors disposed between the first armature and field member, one armature being stationary and the other rotary and the teeth and magnetic conductors being adapted to successively assume radial alinement and form closed paths for the magnetic flux as the field member rotates, whereby rotation is imparted to the rotary armature.

9. A dynamo-electric machine comprising a rotative field member and a winding therefor, a stationary cylindrical armature axially surrounding the field member and provided with a plurality of internal spaced longitudinally-extending teeth and having an armature winding arranged in the slots between the teeth, and a driven member having a different number of circularly arranged spaced longitudinally-extending magnetic conductors disposed between the armature and field member and adapted to successively aline with the teeth on the armature and form closed paths for the magnetic flux as the field member rotates.

10. A dynamo-electric machine comprising a rotative field member and a winding therefor, a stationary cylindrical armature axially surrounding the field member and provided with a plurality of internally spaced longitudinally-extending teeth and having an armature winding arranged in the slots between the teeth, and a driven member having a plurality of circularly arranged spaced longitudinally-extending magnetic conductors disposed between the armature and field member and differing in number from the armature teeth by the number of poles on the field member, the magnetic conductors being adapted to successively assume radial alinement with the teeth on the armature and form closed paths for the magnetic flux as the field member rotates.

11. A dynamo-electric machine comprising a rotative field member and a winding therefor, a cylindrical armature axially surrounding the field member and provided with a plurality of internally spaced longitudinally-extending teeth and with a corresponding number of circularly arranged bars disposed parallel to and in the radial planes with the respective teeth, an armature winding arranged on the said armature and a coöperative armature having two similar circular concentric series of spaced longitudinally-extending bars, the bars of the two series being radially alined and differing in number from those on the first armature and arranged respectively internally and externally thereof, one armature being stationary and the other rotary, and the bars and teeth of the two armatures being adapted to successively assume radial alinement and form closed paths for the magnetic flux as the field member rotates, whereby rotation is imparted to the rotary armature.

12. A dynamo-electric machine comprising a rotative field member and a winding therefor, a stationary cylindrical armature axially surrounding the field member and provided with a plurality of internally spaced longitudinally-extending teeth and with a corresponding number of circularly arranged bars disposed parallel to and in the radial planes with the respective teeth, an armature winding arranged in the slots between the teeth, and a driven armature having two similar circular concentric series of spaced longitudinally-extending bars, the bars of the two series being radially alined and differing in number from those on the stationary armature and arranged, respectively, internally and externally thereof, the bars of the driven armature being adapted to successively assume radial alinement with the bars and teeth on the stationary armature and form closed paths for the magnetic flux as the field member rotates, whereby rotation is imparted to the driven armature.

13. A dynamo-electric machine comprising a rotative field member and a winding therefor, a stationary cylindrical armature axially surrounding the field member and provided with a plurality of internal spaced longitudinally-extending teeth and with a corresponding number of circularly arranged bars disposed parallel to and in the radial planes with the respective teeth, an armature winding arranged in the slots between the teeth, and a driven armature having two similar circular concentric series of spaced longitudinally-extending bars, the bars of the two series being radially alined and arranged respectively internally and externally of those on the stationary armature and differing in number therefrom by the number of poles on the field member, the bars on the driven armature being adapted to successively assume radial alinement with the bars and teeth on the stationary armature and form closed paths for the magnetic flux as the field member rotates, whereby rotation is imparted to the driven armature.

14. A dynamo-electric machine, comprising a rotative field member and a winding therefor, a cylindrical armature axially surrounding the field member and provided with a plurality of internal spaced longitudinally-extending teeth, armature coils arranged in the slots between the teeth, a commutator carried by the said armature having its commutator surface composed of a plurality of insulated segments, the coils being connected to the commutator segments, brushes properly disposed upon the commutator surface and connected to the field winding and revolved by the field member at the angular velocity thereof, and a coöperative armature having a plurality of circularly arranged spaced longitudinally-extending magnetic conductors disposed between the first armature and field member and differing in number from the teeth on the first armature, one armature being stationary and the other rotary and the teeth and magnetic conductors being adapted to successively assume radial alinement and form closed paths for the magnetic flux as the field member rotates, whereby rotation is imparted to the rotary armature.

15. A dynamo-electric machine comprising a rotative field member and a winding therefor, a cylindrical armature axially surrounding the field member and provided with a plurality of internal spaced longitudinally-extending teeth, armature coils arranged in the slots between the teeth, a commutator carried by the said armature having its commutator surface composed of a plurality of insulated segments, the coils being connected to the commutator segment, brushes properly disposed upon the commutator surface and connected to the field winding and revolved by the field member at the angular velocity thereof, collector rings electrically connected to the respective brushes, and a coöperative armature having a plurality of circularly arranged spaced longitudinally-extending magnetic conductors disposed between the first armature and field member and differing in number from the teeth on the first armature, one armature being stationary and the other rotary and the teeth and magnetic conductors being adapted to successively assume radial alinement and form closed paths for the magnetic flux as the field member rotates, whereby rotation is imparted to the rotary armature.

16. A dynamo-electric machine comprising a rotative field member and a winding therefor, a stationary cylindrical armature axially surrounding the field member and provided with a plurality of internal spaced longitudinally-extending teeth, armature coils arranged in the slots between the teeth, a commutator carried by the said armature having its commutator surface composed of a plurality of insulated segments, the coils being connected to the commutator segments, brushes properly disposed upon the commutator surface and connected to the field winding and revolved by the field member at the angular velocity thereof, and a driven member having a plurality of circularly arranged spaced longitudinally-extending magnetic conductors disposed between the cylindrical armature and field member and differing in number from the teeth on the cylindrical armature and adapted to successively aline with the teeth on the armature and form closed paths for the magnetic flux as the field member rotates.

17. A dynamo-electric machine comprising a rotative field member and a winding therefor, a stationary cylindrical armature axially surrounding the field member and provided with a plurality of internal spaced longitudinally extending teeth, armature coils arranged in the slots between the teeth, a commutator carried by the said armature having its commutator surface composed of a plurality of insulated segments, the coils being connected to the armature segments, brushes properly disposed upon the commutator surface and connected to the field winding and revolved by the field member at the angular velocity thereof, collector rings electrically connected to the respective brushes, and a driven member having a plurality of circularly arranged spaced longitudinally extending magnetic conductors disposed between the cylindrical armature and field member and differing in number from the teeth on the cylindrical armature and adapted to successively aline with the teeth on the armature and form closed paths for the magnetic flux as the field member rotates.

18. A dynamo-electric machine comprising a rotative field member and a winding therefor, a stationary cylindrical armature axially surrounding the field member and provided with a plurality of internal spaced longitudinally-extending teeth and with a corresponding number of circularly arranged bars disposed parallel to and in the radial planes with the respective teeth, armature coils arranged on the said armature, a commutator carried by the said armature having its commutator surface composed of a plurality of insulated segments, the coils being connected to the commutator segments, brushes properly disposed upon the commutator surface and connected to the field winding and revolved by the field member at the angular velocity thereof, and a driven armature having two similar circular concentric series of spaced longitudinally-extending bars, the bars of the two series being radially alined and differing in number from those of the stationary armature and arranged respectively internally and externally thereof, the bars of the driven armature being adapted to successively assume radial alinement with the bars and teeth on the stationary armature and form closed paths for the magnetic flux as the field member rotates, whereby rotation is imparted to the driven armature.

19. A dynamo-electric machine comprising a rotative field member and a winding therefor, a stationary cylindrical armature axially surrounding the field member and provided with a plurality of internal spaced longitudinally-extending teeth and with a corresponding number of circularly arranged bars disposed parallel to and in the radial planes with the respective teeth, armature coils arranged on the said armature, a commutator carried by the said armature having its commutator surface composed of a plurality of insulated segments, the coils being connected to the commutator segments, brushes properly disposed upon the commutator surface and connected to the field winding and revolved by the field member at the angular velocity thereof, collector rings electrically connected to the respective brushes, and a driven armature having two similar circular concentric series of spaced longitudinally-extending bars, the bars of the two series being radially alined and differing in number from those of the stationary armature, and arranged respectively internally and externally thereof; the bars of the driven armature being adapted to successively assume radial alinement with the bars and teeth on the stationary armature and form closed paths for the magnetic flux as the field member rotates, whereby rotation is imparted to the driven member.

20. A dynamo-electric machine comprising a rotating field member and a winding therefor, a stationary cylindrical armature axially surrounding the field member and provided with a plurality of internal spaced longitudinally-extending teeth, armature coils arranged in the slots between the teeth, a hollow cylindrical commutator carried by the said armature having its internal commutator surface composed of a plurality of insulated segments, the coils being connected to the commutator segments, properly spaced brushes carried by the field member and bearing against the internal commutator surface and connected to the field winding, collector rings electrically connected to the respective brushes, and a driven member having a plurality of circularly arranged spaced longitudinally-extending magnetic conductors disposed between the armature and field member and adapted to successively aline with the teeth on the armature and form closed paths for the magnetic flux as the field member rotates.

21. A dynamo-electric machine comprising a rotating field member and a winding therefor, a stationary cylindrical armature axially surrounding the field member and provided with a plurality of internal spaced longitudinally-extending teeth, armature coils arranged in the slots between the teeth, a hollow cylindrical commutator carried by the said armature having its internal commutator surface composed of a plurality of insulated segments, the coils being connected to the commutator segments, collector rings having internal brush-engaging surfaces and disposed concentric with and on opposite sides of the commutator, properly spaced brushes carried by the field member and connected to the field winding, and the brush of one polarity bearing against the internal commutator surface and against the internal brush-engaging surface of one ring and the brush of the opposite polarity bearing against the internal commutator surface and against the internal brush-engaging surface of the other ring, and a driven member having a plurality of circularly arranged spaced longitudinally-extending magnetic conductors disposed between the armature and field member and adapted to successively aline with the teeth on the armature and form closed paths for the magnetic flux as the field member rotates.

In witness whereof I subscribe my signature, in the presence of two witnesses.

ALFONS H. NEULAND.

Witnesses:
VICTOR D. BORST,
WALDO M. CHAPIN.